United States Patent

[11] 3,613,856

[72] Inventor David W. Reed
Endicott, N.Y.

[21] Appl. No. 787,451
[22] Filed Dec. 27, 1968
[45] Patented Oct. 19, 1971
[73] Assignee International Business Machines Corporation
Armonk, N.Y.

[54] ANTIWEAR SHIELD FOR CONTINUOUSLY ROTATABLE-TYPE DISC PRINTER
2 Claims, 4 Drawing Figs.

[52] U.S. Cl. .......... 197/54
[51] Int. Cl. .......... B41j 19/04, B41; 1/26
[50] Field of Search .......... 101/93, 102, 407; 197/49, 54, 55, 180, 151, 6.7

[56] References Cited

UNITED STATES PATENTS

| | | | |
|---|---|---|---|
| 3,181,679 | 5/1965 | Stubbmann | 197/6.7 |
| 2,849,096 | 8/1958 | Markes | 197/151 |
| 3,090,297 | 5/1963 | Wilkins et al. | 101/93 C |
| 3,143,063 | 8/1964 | Stark | 101/93 |
| 3,207.069 | 9/1965 | Sumida | 101/32 X |
| 3,312,164 | 4/1967 | Sebring | 101/93 |
| 3,356,199 | 12/1967 | Robinson | 197/54 |

*Primary Examiner*—William B. Penn
*Assistant Examiner*—E. M. Coven
*Attorneys*—Hanifin and Jancin and Francis V. Giolma

ABSTRACT: In a printer having a continuously rotating flexible print wheel or disc and a hammer for impacting the print wheel into engagement with a document of the pressure-sensitive type which is backed by a platen, a flexible antiwear member is mounted to rotate with the print wheel between the print wheel and the document to reduce wear on the type characters on the print wheel.

INVENTOR
DAVID W. REED

BY Francis V. Giolma
ATTORNEY

ANTIWEAR SHIELD FOR CONTINUOUSLY ROTATABLE-TYPE DISC PRINTER

DESCRIPTION OF PRIOR ART

It has been known to use a shield between a print hammer and a folded document which is impacted against a ribbon and type wheel to prevent printing on both portions of the fold.

SUMMARY OF THE INVENTION

Generally stated, it is an object of this invention to provide an improved printer.

More specifically, it is an object of the invention to provide for increasing the life of a molded flexible print disc in a printer.

Another object of the invention is to minimize the abrasive action of a pressure-sensitive paper on a flexible rotating print disc which has raised type characters on its face adjacent the periphery for impacting the paper to print thereon.

It is also an object of this invention to provide for mounting a protective shield on a hub with a continuously rotating print wheel or disc.

Yet another object of the invention is to provide for mounting a disc of polyimide on the same hub as a flexible print disc which is disposed to be impacted against a document by a print hammer so that the polyimide disc can move on the hub relative to the print disc.

Another important object of this invention is to provide for mounting a protective wear disc of polyimide between a polyurethane print disc having raised type characters thereon and a pressure-sensitive paper disposed to be impacted by striking the print disc with a print hammer.

In a preferred embodiment of the invention, a 2.5-mil-thick disc of polyimide sheet material is mounted on the hub of a molded polyurethane print disc assembly which has raised type characters on one face disposed to be impacted against a pressure-sensitive document backed by a platen. A type hammer strikes the print disc to impact selected type characters around the periphery adjacent the document to print them thereon. The polyimide disc normally rotates with the print disc but is stopped or momentarily slowed down by the friction between it and the document when printing so as to cause it to move relative to the print disc each time a character is printed.

The foregoing and other objects, features and advantages of the invention will be apparent from the following more particular description of a preferred embodiment of the invention as illustrated in the accompanying drawings.

DESCRIPTION OF A PREFERRED EMBODIMENT

Figure 1:
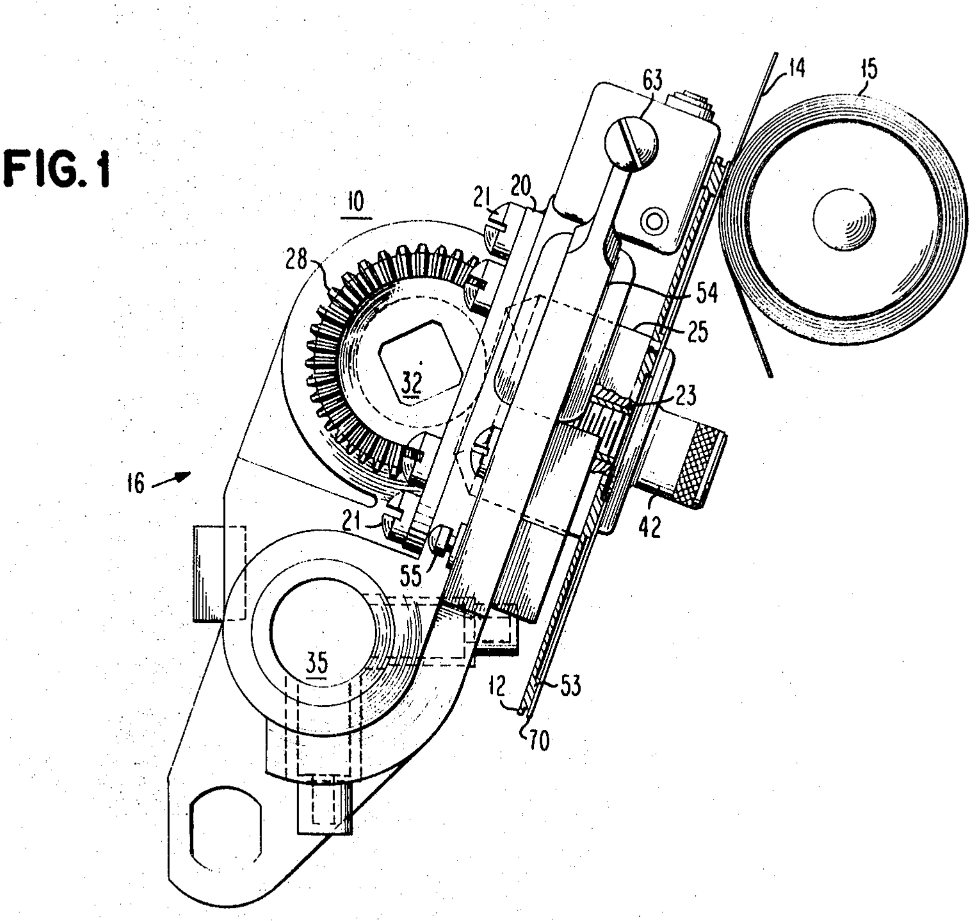
FIG. 1 is a side elevational view partly in section of a print head structure embodying the invention in one of its forms.

Referring particularly to FIG. 1 of the drawings, the reference numeral 10 denotes generally a print head for a printer for rotatably supporting a print disc or wheel 12 for moving it across the face of a document 14 which is backed by a cylindrical print platen 15 for performing a printing operation on the document.

Figure 2:
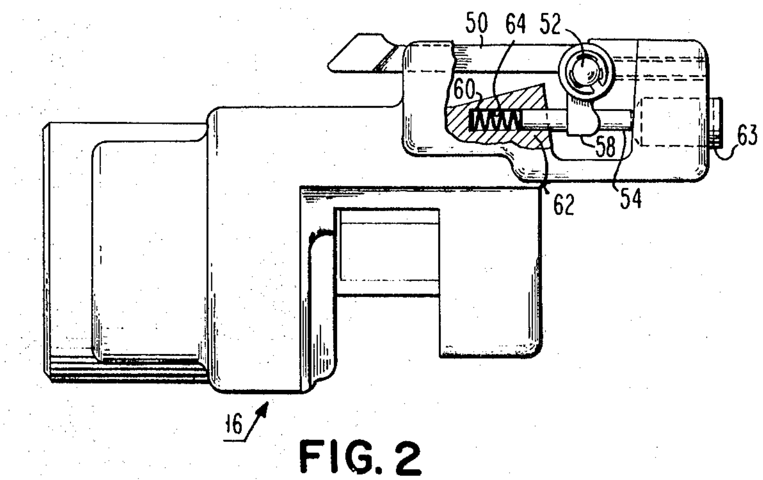
FIG. 2 is a plan view of the print head structure shown in FIG. 1.
Figure 3:
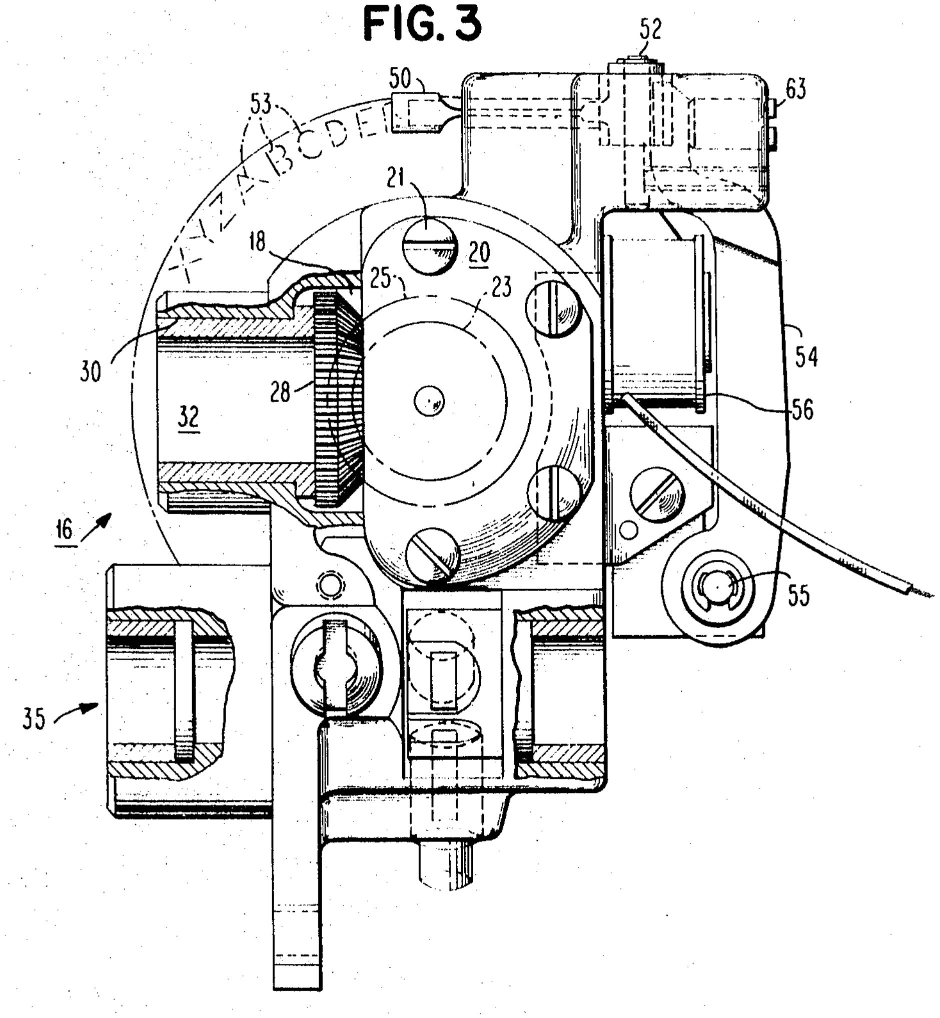
FIG. 3 is a rear elevational view of the print head shown in FIG. 1.

Referring to FIGS. 1, 2, and 3, it will be seen that the print head 10 comprises a main body portion or casting 16 having a central opening 18 which is at least partially enclosed by a cover plate 20 mounted on the rear side by means of screws 21. The cover plate 20 carries a central boss 23 which provides a support for a rotatable bevel gear 25 which mates with a corresponding bevel gear 28 rotatably supported in an axial opening 30 in the body portion 16. The bevel gear 28 has a rectangular axial opening 32 for receiving a square drive shaft (not shown) for driving the gear to turn the mating bevel gear 25. Movement of the print head 16 across the platen 15 is effected by means of a ratchet support and feed shaft (not shown) which is positioned in an axial opening 35 in the lower portion of the print head body 16.

Figure 4:
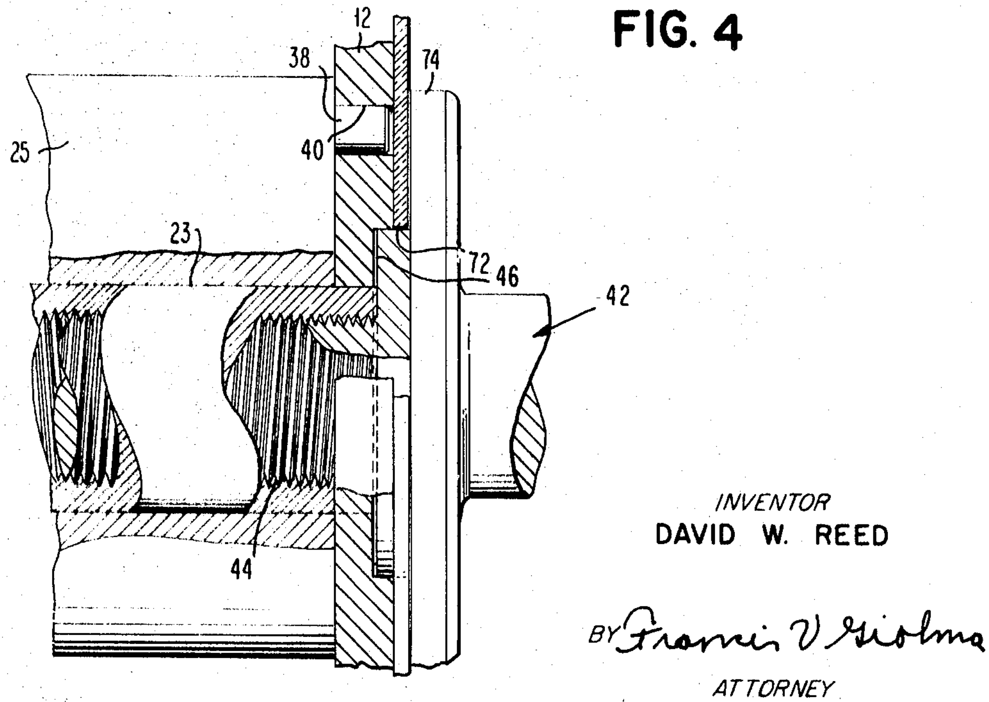
FIG. 4 is an enlarged partionally sectioned view of a portion of the print head shown in FIG. 1 illustrating in detail how the protective antiwear shield is mounted.

As shown in more detail in FIG. 4, the bevel gear 25 is rotatably mounted on the boss 23, and the print disc 12 is rotatably mounted on the boss 23, being connected to the hub of the bevel gear 25 by means of a pin 38 which fits in an opening 40 in the print disc. The print disc 12 is further secured in operating relation with the hub of the bevel gear 25 by means of a flanged thumbscrew 42 having a threaded stem 44 which is threaded into an opening in the boss 23. The thumbscrew 42 is provided with a shoulder portion 46, the face of which abuts the end of the boss 23 and secures the print disc 12 and the bevel gear 25 on the boss 23.

As best shown in FIGS. 2 and 3, a pivoted type hammer 50 is pivotally supported on the print head 10 by means of a pivot 52 and is actuated to strike the print disc 12 and flex it to impact raised type characters 53 adjacent the periphery of the print disc 12 against the document 14 by means of a pivoted armature 54 which is pivotally supported by means of a pivot 55 and actuated by means of an electromagnet 56 to engage one leg 58 of the L-shaped type hammer 50. A spring 60 and pin 62 recessed in a bore 64 provide for restoring the type hammer 50 to the position shown. Stop 63 locates the armature 54.

Because the pressure-sensitive type of document 14 has a relatively high abrasive action on the print disc 12, means such as the antiwear shield or disc 70 is provided. The antiwear disc 70 may comprise a relatively thin flexible sheet of a suitable plastic such as polyimide which is loosely positioned relative to the print disc 12 so as to normally rotate with the print disc but be capable of being stopped or momentarily slowed down whenever the print hammer 50 impacts the print disc 12 against the document 14. For example, the antiwear disc 70 may be mounted on the central hub or shoulder portion 46 of the flanged thumbscrew between the flange 74 and the print disc 12. By providing a clearance fit on the hub 72 and between the flange 74 and the print disc 12, the antiwear disc 70 may normally rotate with the print disc 12 when it is running freely and because of the greater coefficient of friction between the antiwear disc and the document 14 than between the antiwear disc and the print wheel 12, the antiwear disc will be momentarily slowed down or stopped each time the print hammer 50 impacts the type disc 12 to impinge a type character against the document 14.

It has been found in such a printing machine as disclosed and using a pressure-sensitive type of paper for copy with a constantly rotating polyurethane print disc, rapid wear of the type characters around the periphery is normally experienced. The type velocity is approximately 127 inches per second and the print force approximately 12 pounds with a contact time on the order of 100 to 120 microseconds. The velocity and pressure conditions experienced result in a very high frictional force between the characters and the pressure-sensitive paper causing abrasive wear of the type characters. By utilizing a relatively thin, for example 2.5-mil-thick disc of nylon or polyimide mounted with a free-running fit on the hub of the print disc with clearances on the order of 2–4 mils in the fashion hereinbefore described, so as to be able to freely rotate with the type disc and relative thereto, it is found that the coefficient of friction between the polyimide antiwear disc and the polyurethane characters on the type disc is very much less than the coefficient of friction between the pressure-sensitive paper and the polyurethane type characters. When printing occurs, the hammer blow presses the polyurethane character against the polyimide disc and against the pressure-sensitive paper. The difference between the coefficients of friction between the paper, the polyimide disc and the polyurethane characters can cause the polyimide disc to momentarily stop or slow down. The polyurethane character will act against the polyimide disc and through the disc against the document to cause a printing action with the pressure-sensitive type document. With this interface of polyimide between the pressure-sensitive paper and the polyurethane type characters, the life of the print disc can be greatly extended. Data taken in an actual printing operation indicates an improvement in life by at least a factor of 10 over earlier methods without the polyimide interface.

From the above description and the accompanying drawings, it will be apparent that the present invention provides an improved printer. The use of an antiwear shield which rotates with and relatively to a continuously rotating print disc greatly extends the life of the print disc with little or no deterioration in the quality of the printing.

While the invention has been particularly shown and described with reference to a preferred embodiment thereof, it will be understood by those skilled in the art that various changes in form and details may be made therein without departing from the spirit and scope of the invention.

What is claimed is:

1. In printing apparatus in combination, a movable print head having a rotatable hub structure, drive means for continuously rotating said hub structure, a flexible polyurethane rotatable type disc molded with raised type characters on one face adjacent the periphery mounted on said rotatable hub structure with said characters disposed adjacent a pressure-sensitive document containing encapsulated ink and on which printing is to be performed and which has an abrasive surface, a print hammer carried by said print head operable to strike and deflect said type disc and effect impact between said type disc and said document for printing different ones of said characters on said document, and a flexible shield comprising a disc of polyimide on the order of 2.5 mils thick mounted on said rotatable hub structure between said type disc and said document, said shield being normally rotatable with said disc but having a slip fit on said rotatable hub structure so as to be capable of rotational movement relative thereto during impact by said print hammer.

2. The invention as defined in claim 1 characterized by a platen on the opposite side of the document from the print disc providing a backing against which the print disc impacts the pressure-sensitive document, said shield and said document having a coefficient of friction therebetween sufficiently greater than the coefficient of friction between said shield and said print disc to produce momentary relative rotation between said shield and said print disc during impact.